United States Patent [19]

Sasaki et al.

[11] Patent Number: 4,771,023

[45] Date of Patent: * Sep. 13, 1988

[54] PROCESS FOR PRODUCING OLEFIN POLYMERS AND CATALYST USED THEREIN

[75] Inventors: Toshio Sasaki; Masaaki Katao, both of Ichihara; Kiyoshi Kawai, Chiba; Akinobu Shiga, Ichihara, all of Japan

[73] Assignee: Sumitomo Chemical Company, Limited, Osaka, Japan

[*] Notice: The portion of the term of this patent subsequent to Jun. 9, 2004 has been disclaimed.

[21] Appl. No.: 872,900

[22] Filed: Jun. 11, 1986

[30] Foreign Application Priority Data

Jun. 25, 1985 [JP] Japan ................. 60-139951

[51] Int. Cl.$^4$ .............................. C08F 4/64
[52] U.S. Cl. .................... 502/116; 502/115; 502/126; 526/119
[58] Field of Search ............... 502/115, 116, 125, 126

[56] References Cited

U.S. PATENT DOCUMENTS

| 3,412,174 | 11/1968 | Kroll | 502/117 X |
| 3,878,124 | 4/1975 | Durand et al. | 252/429 B |
| 4,284,748 | 8/1981 | Welch | 526/119 |
| 4,335,016 | 6/1982 | Dombro | 252/429 B |
| 4,497,906 | 2/1985 | Hanji et al. | 502/116 X |
| 4,504,637 | 3/1985 | Shiga et al. | 526/119 |
| 4,533,706 | 8/1985 | Shiga et al. | 502/126 X |
| 4,550,094 | 10/1985 | Hanji et al. | 502/116 X |
| 4,672,050 | 6/1987 | Sasaki et al. | 502/116 |

FOREIGN PATENT DOCUMENTS 2265768 10/1975 France .
1498862 1/1978 United Kingdom .

OTHER PUBLICATIONS

Gaylord et al., *Linear and Stereoregular Addition Polymers*, pub. by Interscience Publishers, Inc., N.Y., N.Y., (1959), pp. 91 & 114.

Primary Examiner—Patrick P. Garvin
Attorney, Agent, or Firm—Stevens, Davis, Miller & Mosher

[57] ABSTRACT

Olefin polymers are produced by a process which comprises homopolymerizing or copolymerizing olefins in the presence of a catalyst system comprising:

(A) a solid catalyst component containing a trivalent titanium compound, which is obtained by reducing a titanium compound represented by the general formula $Ti(OR^1)_nX_{4-n}$ (wherein $R^1$ is a hydrocarbon group having 1 to 20 carbon atoms, X is a halogen atom and n is a number satisfying $0 < n \leq 4$) with an organo magnesium compound and then treating the resulting solid product with a mixture of an ether compound and titanium tetrachloride, and (B) an organo aluminum compound.

The above-mentioned reducing of a titanium compound with an organo magnesium compound may be performed in the presence of an organo silicon compound having Si—O bonds.

4 Claims, No Drawings

PROCESS FOR PRODUCING OLEFIN POLYMERS AND CATALYST USED THEREIN

BACKGROUND OF THE INVENTION

1. Field of the Invention

This invention relates to a catalyst for producing olefin polymers, as well as to a process for producing olefin polymers using said catalyst. More particularly, the present invention relates to (1) a solid catalyst component having very high catalytic activities not only per transition metal but also per solid catalyst in various polymerization processes (e.g. slurry polymerization, gas phase polymerization, high temperature solution polymerization, high pressure ionic polymerization), (2) a catalyst system using said solid catalyst component and (3) a process for producing olefin polymers using said catalyst system.

Use of a high activity catalyst in production of olefin polymers has a very high industrial value because it requires no removal of catalyst residue from olefin polymers produced and can provide a simplified process for producing olefin polymers. It is necessary that this high activity catalyst has high catalytic activities not only per transition metal but also per solid catalyst.

When a metal halide such as titanium halide, magnesium halide or the like is used in solid catalysts, high catalytic activity per solid catalyst is necessary also from the standpoint of countermeasures which must be taken for corrosion of equipments and apparatuses caused by active halogen.

2. Description of the Prior Art

Catalysts consisting of a transition metal compound (e.g. titanium tetrachloride) supported by a carrier (e.g. a magnesium compound) have recently been developed. These catalysts have higher catalytic activities than conventional catalysts but are not satisfactory in catalytic activity per solid catalyst (Belgium Patent No. 759601, Japanese Patent Publication No. 46269/1972, Japanese Patent Publication No. 26383/1972, etc.).

As catalyst systems using a solid product obtained by reducing a titanium compound with an organo magnesium compound, there are disclosed solid catalyst components consisting of a Grignard reagent and titanium tetrachloride or an alkoxy-containing titanium halide [Japanese Patent Application Kokai (Laid-open) No. 4391/1971, Japanese Patent Publication No. 40959/1972, Japanese Patent Publication No. 39470/1975, U.S. Pat. No. 3,917,575, etc.], as well as solid catalyst components obtained by reacting a Grignard reagent with an alkoxy-containing titanium halide and then treating the resulting reaction product with titanium tetrachloride [Japanese Patent Publication No. 24361/1972, Japanese Patent Application Kokai (Laid-open) No. 115302/1971, etc.]. However, these solid catalyst components are not satisfactory in catalytic activities per transition metal and also per solid catalyst component.

SUMMARY OF THE INVENTION

Under such circumstances, the objects of the present invention reside in providing (1) a solid catalyst component having such high catalytic activities not only per transition metal but also per solid catalyst component as making the removal of catalyst residue unnecessary, (2) a catalyst system using said solid catalyst component and (3) a process for producing olefin polymers using said catalyst system.

According to the present invention, there are provided:

(I) a solid catalyst component (A) containing a trivalent titanium compound, which is obtained by reducing a titanium compound represented by the general formula $Ti(OR^1)_n X_{4-n}$ (wherein $R^1$ is a hydrocarbon group having 1 to 20 carbon atoms, X is a halogen atom and n is a number satisfying $0 < n \leq 4$) with an organo magnesium compound and then treating the resulting solid product with a mixture of an ether compound and titanium tetrachloride, (II) a catalyst system consisting of said solid catalyst component (A) and an organo aluminum compound (B), and (III) a process for homopolymerizing or copolymerizing olefins using said catalyst system.

DETAILED DESCRIPTION OF THE INVENTION

The present invention will be explained specifically below.

(a) Titanium compound

The titanium compound used in the present invention is represented by the general formula $Ti(OR^1)_n X_{4-n}$ (wherein $R^1$ is a hydrocarbon group of 1 to 20 carbon atoms; X is a halogen atom; and n is a number satisfying $0 < n \leq 4$). Specific examples of $R^1$ include alkyl groups such as methyl, ethyl, n-propyl, isopropyl, n-butyl, isobutyl, n-amyl, isoamyl, n-hexyl, n-heptyl, n-octyl, n-decyl, n-dodecyl and the like; aryl groups such as phenyl, cresyl, xylyl, naphthyl and the like; cycloalkyl groups such as cyclohexyl, cyclopentyl and the like; alkenyl groups such as propenyl and the like; and aralkyl groups such as benzyl and the like.

As the $R^1$, an alkyl group of 2 to 18 carbon atoms or an aryl group of 6 to 18 carbon atoms is preferred. A straight chain alkyl group of 2 to 18 carbon atoms is particularly preferred.

It is possible to use a titanium compound having two or more different $-OR^1$ groups.

As the halogen atom represented by X, there can be used chlorine, bromine, iodine or the like. Of these, chlorine gives a most desirable result.

The n of the general formula $Ti(OR^1)_n X_{4-n}$ is a number satisfying $0 < n \leq 4$, preferably $2 \leq n \leq 4$, more preferably 4.

The titanium compound represented by the general formula $Ti(OR^1)_n X_{4-n}$ ($0 < n \leq 4$) can be produced in accordance with known synthesis processes. For example, it can be produced in accordance with a process of reacting $Ti(OR^1)_4$ and $TiX_4$ in a given proportion or with a process of reacting $TiX_4$ with a corresponding alcohol in a given proportion.

(b) Organo silicon compound having Si—O bonds

The organo silicon compound having Si—O bonds, used in the synthesis of the component (A) of the present catalyst system is represented by the following general formula.

$Si(OR^3)_m R^4_{4-m'}$ $R^5(R^6_2SiO)_p SiR^7_3$ $(R^8_2SiO)_q$ (wherein $R^3$ is a hydrocarbon group having 1 to 20 carbon atoms; $R^4$, $R^5$, $R^6$, $R^7$ and $R^8$ are each a hydrocarbon group having 1 to 20 carbon atoms or a hydrogen atom; m is a number satisfying $0 < m \leq 4$; p is an integer of 1 to 1,000; and q is an integer of 2 to 1,000).

Specific examples of the organo silicon compound include the following compounds.

Tetramethoxysilane, dimethyldimethoxysilane, tetraethoxysilane, triethoxyethylsilane, diethoxyethylsilane, ethoxytriethylsilane, tetraisopropoxysilane, diisopropoxydiisopropylsilane, tetrapropoxysilane, dipropoxydipropylsilane, tetra-n-butoxysilane, di-n-butoxy-di-n-butylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, dimethylpolysiloxane, diphenylpolysiloxane, methylhydropolysiloxane, and phenylhydropolysiloxane.

Preferable of these are alkoxysilane compounds represented by the general formula $Si(OR^3)_m R^4_{4-m}$. The letter, m, is preferred to be $1 < m \leq 4$. A tetraalkoxysilane compound (m=4) is particularly preferred.

(c) Organo magnesium compound

The organo magnesium compound used in the present invention can be any organo magnesium compound as long as it has at least one Mg—C bond. There is preferably used a Grignard compound represented by the general formula $R^9MgX$ (wherein $R^9$ is a hydrocarbon group having 1 to 20 carbon atoms and X is a halogen atom), or a dialkylmagnesium compound or a diarylmagnesium compound both represented by the general formula $R^{10}R^{11}Mg$ (wherein $R^{10}$ and $R^{11}$ are each a hydrocarbon group having 1 to 20 carbon atoms). The symbols, $R^9$, $R^{10}$ and $R^{11}$ can be same or different and are each an alkyl, aryl, aralkyl or alkenyl group of 1 to 20 carbon atoms such as methyl, ethyl, n-propyl, isopropyl, n-butyl, sec-butyl, tert-butyl, n-amyl, isoamyl, n-hexyl, n-octyl, 2-ethylhexyl, phenyl, benzyl or the like.

Specific examples of the Grignard compound include methylmagnesium chloride, ethylmagnesium chloride, ethylmagnesium bromide, ethylmagnesium iodie, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, n-amylmagnesium chloride, isoamylmagnesium chloride, phenylmagnesium chloride and phenylmagnesium bromide. Specific examples of the compound represented by $R^{10}R^{11}Mg$ include diethylmagnesium, di-n-propylmagnesium, diisopropylmagnesium, di-n-butylmagnesium, di-sec-butylmagnesium, di-tert-butylmagnesium, n-butylsec-butylmagnesium, di-n-amylmagnesiu and diphenylmagnesium.

As the synthesis solvent for the organo magnesium compound, there can be used an ether solvent such as diethyl ether, di-n-propyl ether, diisopropyl ether, di-n-butyl ether, diisobutyl ether, di-n-amyl ether, diisoamyl ether, di-n-hexyl ether, di-n-octyl ether, diphenyl ether, dibenzyl ether, phenetol, anisole, tetrahydrofuran, tetrahydropyran or the like. Alternatively, there can be used a hydrocarbon solvent such as hexane, heptane, octane, cyclohexane, methylcyclohexane, benzene, toluene, xylene or the like, or a mixed solvent of an ether solvent and a hydrocarbon solvent. The organo magnesium compound is used preferably in the form of ether solution. The ether in this case is an ether compound having at least 6 carbon atoms within the molecule or having a cyclic structure.

The use of a Grignard compound represented by $R^9MgCl$ in the form of an ether solution is particularly preferred from the point of catalyst potency.

The organo magnesium compound can also be used in the form of a hydrocarbon-soluble complex between said compound and an organo metal compound capable of rendering the organo magnesium compound soluble in hydrocarbons. Examples of the organo metal compound include organic compounds of Li, Be, B, Al or Zn.

(d) Ether compound

As the ether compound of the present invention, there are preferably used dialkyl ethers such as diethyl ether, di-n-propyl ether, diisopropyl ether, di-n-butyl ether, di-n-amyl ether, diisoamyl ether, dineopentyl ether, di-n-hexyl ether, di-n-octyl ether, methyl n-butyl ether, methyl isoamyl ether, ethyl isobutyl ether and the like.

Of these, di-n-butyl ether and diisoamyl ether are particularly preferable.

(e) Synthesis of the solid catalyst component (A)

The solid catalyst component (A) of the present invention can be synthesized by reducing a titanium compound represented by the general formula $Ti(OR^1)_n X_{4-n}$ with an organo magnesium compound and then treating the resulting solid product with a mixture of an ether compound and titanium teterachloride.

Preferably, the reduction of the titanium compound with the organo magnesium compound is conducted in the presence of an organo silicon compound having Si—O bonds.

All the steps of the synthesis reaction are conducted in an inert gas atomosphere such as nitrogen, argon or the like.

In the reduction of the titanium compound with the organo magnesium compound, the organo magnesium compound is added to a mixture of the titanium compound and the organo silicon compound. Alternatively, said mixture of the titanium compound and the organo silicon compound may be added to a solution of the organo magnesium compound. In view of the catalytic activity, a process comprising adding an organo magnesium compound to a mixture of a titanium compound and an organo silicone compound is preferred.

Preferably, the titanium compound and the organo silicon compound are used after having been dissolved in or diluted by an appropriate solvent.

As such a solvent, there can be mentioned aliphatic hydrocarbons such as hexane, heptane, octane, decane and the like; aromatic hydrocarbons such a toluene, xylene, decalin and the like; alicyclic hydrocarbons such as cyclohexane, methylcyclohexane and the like; and ether compounds such as diethyl ether, dibutyl ether, diisoamyl ether, tetrahydrofuran and the like.

The reduction temperature is generally $-50°$ to $70°$ C., preferably $-30°$ to $50°$ C., and particularly preferably $-25°$ to $35°$ C. If the reduction temperature is excessively high, the catalytric activity lowers.

The dropping time has no particular restriction but ordinarily is 30 minutes to about 6 hours. After the completion of the reduction, a post-reaction may be conducted at a temperature of $20°$ to $120°$ C.

The amount of the organo silicon compound used is 0 to 50, preferably 1 to 30, particularly preferably 3 to 25 in terms of Si/Ti, namely, the atomic ratio of silicon atom to titanium atom in titanium compound.

The amount of the organo magnesium compound used is 0.1 to 10, preferably 0.2 to 5.0, particularly preferably 0.5 to 2.0 in terms of (Ti+Si)/Mg, namely, the atomic ratio of the sum of titanium atom and silicon atom to magnesium atom.

The solid product obtained by the reduction is subjected to solid-liquid separation and then washed several times with an inert hydrocarbon solvent such as hexane, heptane or the like.

The solid product thus obtained contains trivalent titanium, magnesium and hydrocarbyloxy group and is generally amorphous or very slightly crystalline. Preferably, it has an amorphous structure from the point of catalyst potency.

The solid product is then treated with a mixture of an ether compound and titanium tetrachloride.

The treatment of the solid product with a mixture of the ether compound and titanium tetrachloride is preferably conducted in a slurry state. The solvent used for slurrying includes aliphatic hydrocarbons such as pentane, hexane, heptane, octane, decane and the like; aromatic hydrocarbons such as toluene, xylene, decalin and the like; alicyclic hydrocarbons such as cyclohexane, methylcyclohexane and the like; and halogenated hydrocarbons such as dichlorethane, trichloroethane, trichloroethylene, monochlorobenzene, dichlorobenzene, trichlorobenzene and the like.

The slury concentration is preferably 0.05 to 0.5 g solid/ml solvent, particularly preferably 0.1 to 0.3 g solid/ml solvent.

The reaction temperature is 30° to 150° C., preferably 45° to 120° C., particularly preferably 60° to 100° C.

The reaction time has no particular restriction but ordinarily is 30 minutes to 6 hours.

With respect to the addition order of the solid product, the ether compound and titanium tetrachloride, the ether compound and titanium tetrachloride can be added to the solid product, or, the solid product can be added to a solution containing both the ether compound and titanium tetrachloride.

When the ether compound and titanium tetrachloride are added to the solid product, it is preferable that the ether compound and titanium tetrachloride be added separately in this order or simultaneouly.

The reaction of the solid product with a mixture of the ether compound and titanium tetrachloride can be conducted two times or more.

The amount of the ether compound used is 0.1 to 100 moles, preferably 0.5 to 50 moles, particularly preferably 1 to 20 moles per 1 mole of titanium atom in solid product.

The amount of titanium tetrachloride added is 1 to 1,000 moles, preferably 3 to 500 moles, particularly preferably 10 to 300 moles per 1 mole of titanium atom in solid product. The amount of titanium tetrachloride added is also 1 to 100 moles, preferably 1.5 to 75 moles, particularly preferably 2 to 50 moles per 1 mole of ether compound.

The thus obtained solid catalyst component containing a trivalent titanium compound is subjected to solid-liquid separation. The resulting solid is washed several times with an inert hydrocarbon solvent such as hexane, heptane or the like and then is used for polymerization of olefins.

The solid obtained from the step of solid-liquid separation may be washed with an excessive amount of a halogenated hydrocarbon solvent (e.g. monochlorobenzene) at least one time at a temperature of 50° to 120° C., followed by several times of washing with an aliphatic hydrocarbon solvent (e.g. hexane) and then be used for olefin polymerization.

(f) Organo aluminum compound (B)

The organo aluminum compound (B) used in combination with the solid catalyst component (A) in the present invention has at least one Al—C bond in the molecule. The organo aluminum compound are typically represented by the following general formulas.

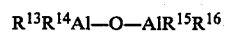

(wherein $R^{12}$, $R^{13}$, $R^{14}$, $R^{15}$ and $R^{16}$ are each a hydrocarbon group having 1 to 8 carbon atoms; Y is a halogen atom, a hydrogen atom or an alkoxy group; and $\gamma$ is a number satisfying $2 \leq \gamma \leq 3$).

Specific examples of the organo aluminum compound include trialkylaluminums such as triethylaluminum, triisobutylaluminum, trihexylaluminum and the like; dialkylaluminum hydrides such as diethylaluminum hydride, diisobutylaluminum hydride and the like; dialkylaluminum halides such as diethylaluminum chloride and the like; mixtures between a trialkylaluminum and a dialkylaluminum halide; and alkyl alumoxanes such as tetraethyl dialumoxane, tetrabutyl dialumoxane and the like.

Preferable of these organo aluminum compounds are trialkylaluminums, mixtures of a trialkylaluminum and a dialkylaluminum halide, and alkyl alumoxanes. Particularly preferable are triethylaluminum, triisobutylaluminum, a mixture of triethylaluminum and diethylaluminum chloride, and tetraethyl dialumoxane.

The amount of the organo aluminum compound used can be selected as widely as 1 to 1,000 moles per 1 mole of titanium atom in solid catalyst. The amount preferably is 5 to 600 moles.

(g) Polymerization of olefins

Feeding of each catalyst component into a polymerization reactor can be conducted with no particular restriction except that the feeding is conducted in an inert gas such as nitrogen, argon or the like which is free from moisture.

The catalyst components (A) and (B) can be fed separately, or, can be contacted with each other in advance before feeding.

The polymerization can be carried out at temperatures between −30° C. and 200° C.

The polymerization pressure has no particular restriction but desirably is about 3 to 100 atm from industrial and economical standpoints. The polymerization can use a continuous method or a batch method. Also, the polymerization can use a slurry polymerization method employing an inert hydrocarbon solvent such as propane, butane, pentane, hexane, heptane, octane or the like or a liquid phase or gas phase polymerization method employing no solvent.

The olefins usable in the present invention are those having 2 or more carbon atoms. Specifically there can be mentioned ethylene, propylene, butene-1, pentene-1, hexene-1, 3-methylpentene-1, 4-methylpentene-1, etc. Needless to say, other olefins can be used in the present invention. The polymerization according to the present invention can be homopolymerization or copolymerization. In copolymerization, a mixture of two or more different olefins is contacted with the present catalyst system, whereby a copolymer is produced.

Heteroblock copolymerization wherein polymerization is conducted in two or more stages can also be conducted easily with the present catalyst system.

It is also possible to add a chain transfer agent such as hydrogen to the polymerization system in order to control the molecular weight of the polymer obtained.

It is also possible to add a known electron-donating compound to the polymerization system in order to improve the stereoregularity and molecular weight of the polymer obtained. Typical examples of such an electron-donating compound are organic carboxylic acid esters such as methyl methacrylate, methyl toluate and the like; phosphorous acid esters such as triphenyl phosphite and the like; silicic acid esters such as tetraethoxysilane, phenyltriethoxysilane and the like.

The present invention will be explained in more detail below by way of Examples and Comparative Examples but the invention is not limited thereto.

EXAMPLE 1

(1) Synthesis of organo magnesium compound

A flask having an internal volume of 1 liter, equipped with a stirrer, a reflux condenser, a dropping funnel and a thermometer was purged with argon. 32.0 g of chipped magnesium for Grignard reagent was placed therein. 120 g of n-butyl chloride and 500 ml of di-n-butyl ether were placed in the dropping funnel and about 30 ml of the resulting mixture was dropped into the flask to start a reaction with magnesium. This dropping was continued at 50° C. for 4 hours from the start of the reaction. After the termination of the dropping, the reaction was continued for further 1 hour at 60° C. Then, the reaction mixture was cooled down to room temperature and the solid portion was removed by filtration.

N-Butylmagnesium chloride present in di-n-butyl ether was hydrolyzed with 1N sulfuric acid and back-titrated with a 1N aqueous sodium hydroxide solution using phenolphthalein as an indicator to determine the concentration of n-butylmagnesium chloride. The concentration was 2.03 moles per liter.

(2) Synthesis of solid product

A flask having an internal volume of 500 ml, equipped with a stirrer and a dropping funnel was purged with argon. Therein were placed 300 ml of n-heptane, 31 g of tetrabutoxytitanium and 18 g of ethyl orthosilicate, and they were made into a uniform solution. Then, 100 ml of the organo magnesium compound prepared in the above (1), placed in the dropping funnel of the flask was slowly dropped into the flask in 2 hours while keeping the temperature inside the flask at 5° C., to effect a reduction reaction. After the termination of the dropping, stirring was continued for further 1 hour at room temperature, after which the reaction mixture was allowed to stand at room temperature to conduct solid-liquid separation. The solid was washed three times with 300 ml of n-heptane and then dried under vacuum to obtain a grayish brown solid product.

(3) Synthesis of solid catalyst component containing tri-valent titanium compound A flask having an internal volume of 100 ml was purged with argon. Therein were placed 11.3 g of the solid product prepared in the above (2) and 56 ml of n-heptane. The temperature of the flask was kept at 80° C.

Thereto were added 7.6 ml of di-n-butyl ether and 29 ml of titanium tetrachloride, and reaction was conducted at 80° C. for 1 hour.

The reaction mixture was allowed to stand at room temperature for solid-liquid separation. The solid was washed four times with 50 ml of n-heptane and dried under vacuum to obtain a solid catalyst component of violet color.

1 g of this solid catalyst component contained 2.6 mM of titanium, 5.5 mM of magnesium, 0.27 mM of ethoxy group, 0.32 mM of butoxy group and 0.69 mM of butyl ether.

(4) Polymerization of ethylene

An autoclave having an internal volume of 0.4 liter, equipped with a stirrer was thoroughly purged with argon. Therein was placed 250 ml of n-heptane. The autoclave was heated to 180° C. and ethylene was added until the total pressure inside the autoclave became 12.5 kg/cm$^2$. Further, 20 mg of the solid catalyst component prepared in the above (3) and 1 mM of triethylaluminum were added to start a polymerization. The polymerization was conducted for 5 minutes at 180° C. while continuously feeding ethylene to keep the total pressure at the above mentioned level. After the completion of the polymerization, the reaction mixture was filtered to separate the polymer formed. The polymer was dried at 60° C. under vacuum and 14.4 g of the polymer was gained. The catalytic activities of the catalyst used were 719 g.polymer/g.solid catalyst and 5,750 g.polymer/g.titanium.

COMPARATIVE EXAMPLE 1

A solid catalyt component was synthesized in the same procedure as in Example 1 except that di-n-butyl ether used in (3) synthesis of solid catalyst component of Example 1 was not used. 1 g of this solid catalyst component contained 3.2 mM of titanium, 3.9 mM of magnesium, 0.82 mM of ethoxy group and 0.75 mM of butoxy group.

Using the above solid catalyst, ethylene was polymerized in the same procedure as in (4) of Example 1. The catalytic activities of the catalyst used were 250 g.polymer/g.solid catalyst and 1,600 g.polymer/g.titanium.

EXAMPLE 2

(1) Synthesis of solid product

A flask having an internal volume of 500 ml, equipped with a stirrer and a dropping funnel were purged with argon. Therein were placed 23 g of tetrabutoxytitanium, 52 g of ethyl orthosilicate and 310 m of heptane, and they were made into a uniform solution. 150 ml of the organo magnesium compound synthesized in (1) of Example 1, placed in the dropping funnel of the flask was slowly dropped in 2 hours while keeping the temperature inside the flask at 5° C., to effect a reduction reaction. After the completion of the dropping, stirring was continued for further 1 hour at room temperature. The reaction mixture was allowed to stand at room temperature for solid-liquid separation. The solid was washed three times with 300 ml of n-heptane and dried under vacuum to obtain a grayish brown solid product.

1 g of this solid product contained 0.77 mM of tri-valent titanium, 6.2 mM of magnesium, 7.0 mM of ethoxy group and 1.9 mM of butoxy group.

(2) Synthesis of solid catalyst component

A flask having an internal volume of 100 ml was purged with argon. Therein were placed 7.1 g of the solid product prepared in the above (1) and 30 ml of n-heptane. The temperature inside the flask was kept at 80° C. Then, 2.8 ml of di-n-butyl ether and 19 ml of titanium tetrachloride were added and a reaction was conducted at 80° C. for 1 hour. The reaction mixture was allowed to stand at room temperature for solid-liquid separation. The solid was washed four times with 80 ml of n-heptane and dried under vacuum to obtain a solid catalyst component of violet color.

1 g of this solid catalyst contained 2.7 mM of titanium, 5.1 mM of magnesium, 0.57 mM of ethoxy group and 0.19 mM of butoxy group.

(3) Polymerization of ethylene

Ethylene polymerization was conducted in the same procedure as in Example 1-(4) except that the solid catalyst component prepared in the above (2) was used. The catalytic activities of the catalyst used were 563 g.polymer/g.solid catalyst and 4,330 g.polyer/g.titanium.

EXAMPLE 3

A solid catalyst component was synthesized in the same procedure as in Example 2-(2) except that the amount of titanium tetrachloride used was changed to 37 ml. 1 g of this solid catalyst component contained 2.7 mM of titanium, 5.4 mM of magnesium, 0.43 mM of ethoxy group and 0.16 mM of butoxy group. Using this solid catalyst component, ethylene polymerization was conducted in the same procedure as in Example 1-(4). The catalytic activities of the catalyst used were 760 g.polymer/g.solid catalyst and 5,890 g.polymer/g.titanium.

EXMAPLE 4

A solid catalyst component was synthesized in the same procedure as in Example 2-(2) except that the amount of titanium tetrachloride used was changed to 55 ml. 1 g of this solid catalyst component contained 1.8 mM of titanium, 6.1 mM of magnesium, 0.46 mM of ethoxy group and 0.27 mM of butoxy group.

Using the above solid catalyst component, ethylene polymerization was conducted in the same procedure as in Example 1-(4). The catalytic activities of the catalyst used were 781 g.polymer/g.solid catalyst and 9,170 g.polymer/g.titanium.

EXAMPLE 5

A solid catalyst component was synthesized in the same procedure as in Example 2-(2) except that the amount of di-n-butyl ether used was changed to 1.4 ml. 1 g of this solid catalyst component contained 2.9 mM of titanium, 5.4 mM of magnesium, 0.61 mM of ethoxy group and 0.17 mM of butoxy group.

Using the above catalyst component, ethlene polymerization was conducted in the same procedure as in Example 1-(4). The catalytic activities of the catalyst used were 490 g.polymer/g.solid catalyst and 3,520 g.polymer/g.titanium.

EXAMPLE 6

A solid catalyst component was synthesized in the same procedure as in Example 2-(2) except that the amount of di-n-butyl ether was changed to 11 ml. 1 g of this solid catalyst component contained 1.4 mM of titanium, 6.2 mM of magnesium, 0.16 mM of ethoxy group and 0.25 mM of butoxy group.

Using this catalyst component, ethylene polymerization was conducted in the same procedure as in Example 1-(4). The catalytic activities of the catalyst used were 854 g.polymer/g.solid catalyst and 12,700 g.polymer/g.titanium.

EXAMPLE 7

A solid catalyst component was synthesized in the same procedure as in Example 2-(2) except that the amount of di-n-butyl ether used was changed to 21 ml. 1 g of this solid catalyst component contained 0.75 mM of titanium, 8.4 mM of magnesium, 0.08 mM of ethoxy group and 0.06 mM of butoxy group.

Using this catalyst component, ethylene polymerization was conducted in the same procedure as in Example 1-(4). The catalytic activities of the catalyst used were 313 g.polymer/g.solid catalyst and 8,650 g.polymer/g.titanium.

EXAMPLE 8

(1) Polymerization of ethylene

An autoclave having an internal volume of 0.4 liter, equipped with a stirrer was purged thoroughly with argon. Therein were placed 200 ml of n-heptane and 5 g of butene-1. The temperature of the autoclave was increased to 50° C. and ethylene was fed thereinto until the total pressure inside the autoclave became 3.1 kg/cm$^2$. 2 mg of the solid catalyst component prepared in Example 1 and 1 mM of triethylaluminum were added, after which a polymerization was started. The polymerization was conducted at 50° C. for 1 hour while continuously feeding ethylene to keep the total pressure at the above mentioned level. After the completion of the polymerization, the reaction mixture was filtered to separate the polymer formed. The polymer was dried at 60° C. under vacuum. The catalytic activities of the catalyst used were 24,200 g.polymer/g.solid catalyst and 164,000 g.polymer/g.titanium.

COMPARATIVE EXAMPLE 2

Ethylene polymerization was conducted in the same procedure as in Example 8 except that the solid catalyst component prepared in Comparative Example 1 was used in Comparative Example 2. The catalytic activities of the catalyst used were, in this case, 18,600 g.polymer/g.solid catalyst and 121,000 g.polymer/g.titanium.

EXAMPLE 9

(1) Synthesis of solid product

A flask having an internal volume of 500 ml, equipped with a stirrer and a dropping funnel was pruged with argon. Therein were placed 34 g of tetrabutoxytitanium and 210 ml of heptane, and they were made into a uniform solution. 50 ml of the organo magnesium compound prepared in Example 1-(1), placed in the dropping funnel of the flask was slowly dropped in 2 hours while keeping the temperature inside the flask at 5° C., to effect a reduction reaction. After the completion of the dropping, stirring was continued for further 1 hour at room temperature. The reaction mixture was allowed to stand at room temperature for solid-liquid separation. The solid was washed three times with 300 ml of n-heptane and dried under vacuum to obtain a blackish brown solid product.

1 g of this solid product contained 1.9 mM of tri-valent titanium, 1.7 mM of magnesium and 7.2 mM of butoxy group.

(2) Synthesis of solid catalyst component containing tri-valent titanium compound A flask having an internal volume of 100 ml was purged with argon. Therein were placed 9.3 g of the solid product prepared in the above (1) and 39 ml of n-heptane. The temperature inside the flask was kept at 80° C.

Then, 4.7 ml of diisoamyl ether and 50 ml of titanium tetrachloride were added and a reaction was conducted at 80° C. for 1 hour.

The reaction mixture was allowed to stand at room temperature for solid-liquid separation. The solid was washed four times with 50 ml of n-heptane and dried under vacuum to obtain a solid catalyst component of vilet color.

1 g of this solid catalyst component contained 2.9 mM of titanium, 3.1 mM of magnesium, 0.27 mM of butoxy group and 0.41 mM of diisoamyl ether.

(3) Polymerization of ethylene

An autoclave having an internal volume of 0.4 liter, equipped with a stirrer was purged with argon thoroughly. Therein were added 200 ml of cyclohexane and 10 g of butene-1. The temperature inside the autoclave was increased to 230° C. and ethylene was fed into the autoclave until the total pressure inside the autoclave became 39.0 kg/cm$^2$. Then, 30 mg of the solid catalyst component prepared in the above (2) and 1 mM of triethylaluminum were added to start a polymerization. The polymerization was conducted at 230° C. for 2 minutes while continuously feeding ethylene to keep the total pressure at the above mentioned level. After the completion of the polymerization, the polymer formed was separated by filtration and dried at 60° C. under vacuum. The catalytic activities of the catalyst used were 96 g.polymer/g.solid catalyst and 700 g.polymer/g.titanium.

EXAMPLE 10

(1) Synthesis of solid catalyst component containing tri-valent titanium compound By using 10 g of the solid product prepared in Example 9-(1) and by adding diisoamyl ether and titanium tetrachloride, a reaction was conducted in the same procedure as in Example 9-(2). The reaction product was separated and washed with n-heptane. The resulting product was subjected to two more times of reaction with diisoamyl ether and titanium tetrachloride. 1 g of the solid catalyst component thus obtained contained 2.7 mM of titanium, 3.9 mM of magnesium, 0.03 mM of butoxy group and 0.53 mM of diisoamyl ether.

(2) Polymerization of ethylene

Ethylene polymerization was conducted in the same procedure as in Example 9-(3) except that the solid catalyst component prepared in the above (1) was used. The catalytic activities of the catalyst used were 113 g.polymer/solid catalyst and 860 g.polymer/g.titanium.

EXAMPLE 11

Ethylene polymerization was conducted in the same procedure as in Example 9-(3) except that the solid catalyst component prepared in Example 10-(1) was used and triethylaluminum was replaced by 1 mM of diethylaluminum chloride. The catalytic activities of the catalyst used were 347 g.polymer/g.solid catalyst and 2,650 g.polymer/g.titanium.

EXAMPLE 12

(1) Polymerization of propylene

A stainless steel autoclave of magnetic stirring type, having an internal volume of 130 ml was purged with argon. Therein were placed 0.57 mM of triethylaluminum, 0.057 mM of ethyl phenylsilicate, 10 mg of the solid catalyst component prepared in Example 1 and 80 ml of liquefied propylene.

The autoclave contents were kept at 60° C. for 1 hour with stirring. Excessive propylene was released. The polypropylene formed was air-dried for 24 hours. The catalytic activity of the catalyst used was 1,500 g.polymer/g.solid catalyst.

The percentage of insolubles when the polypropylene powder obtained was subjected to 6 hours extraction with boiling n-heptane (hereinafter this percentage is abbreviated to "IY") was 81.9%.

COMPARATIVE EXAMPLE 3

Propylene polymerization was conducted in the same procedure as in Example 12 except that the solid catalyst component of Comparative Example 1 was used. The catalytic activity of the catalyst used was 710 g.polymer/g.solid catalyst. IY was 73.6%.

As appreciated from the above explanation, the catalyst system of the present invention has very high catalytic activities not only per solid catalyst but also per titanium atom. Hence, polymers produced with said catalyst system, without employing any special procedure for catalyst residue removal, are very low in halogen atom and titanium atom contents which greatly affect the coloring, stability and corrosiveness of polymers. This requires no facility for catalyst residue removal and can reduce the production cost of olefin polymers.

What is claimed is:

1. A solid catalyst component for olefin polymerization, which is obtained by reducing a titanium compound represented by the general formula Ti(OR$^1$)$_n$X$_{4-n}$ (wherein R$^1$ is a hydrocarbon group having 1 to 20 carbon atoms, X is a halogen atom and n is a number satisfying 0<n≦4) with an organo magnesium compound in the presence of an organo silicon compound having Si—O bonds represented by the following general formula:

Si(OR$^3$)$_m$R$^4_{4-m}$,

R$^5$(R$^6_2$SiO)$_p$SiR$^7_3$ or

(R$^8_2$SiO)$_q$ (wherein R$^3$ is a hydrocarbon group having 1 to 20 carbon atoms; R$^4$, R$^5$, R$^6$, R$^7$ and R$^8$ are each a hydrocarbon group having 1 to 20 carbon atoms or a hydrogen atom; m is a number satisfying 0<m≦4; p is an integer of 1 to 1,000; and q is an integer of 2 to 1,000; and then treating the resulting solid product with a mixture of dialkyl ether and titanium tetrachloride.

2. A solid catalyst component according to claim 1, wherein the organo silicon compound having Si—O bonds is an alkoxysilane compound represented by the general formula Si(OR$^3$)$_m$R$^4_{4-m}$, in which m is a number satisfying 1≦m≦4.

3. A solid catalyst component according to claim 1, wherein the organo silicon compound having Si—O bonds is used in an amount of 1 to 30 in terms of the atomic ratio of silicon atom to titanium atom in titanium compound.

4. A catalyst system for olefin polymerization comprising (A) a solid catalyst component containing a trivalent titanium compound and (B) an organo aluminum comound; wherein the solid catalyst component (A) containing the tri-valent titanium compound is obtained by reducing a titanium compound represented by the general formula $Ti(OR^1)_n X_{4-n}$ (wherein $R^1$ is a hydrocarbon group having 1 to 20 carbon atoms, X is a halogen atom and n is a number satisfying $0 < n \leq 4$) with an organo magnesium compound in the presence of an organo silicon compound having Si—O bonds represented by the following general formula:

$$Si(OR^3)_m R^4_{4-m},$$

$$R^5(R^6_2 SiO)_p SiR^7_3 \text{ or}$$

$$(R^8_2 SiO)_q$$

(wherein $R^3$ is a hydrocarbon group having 1 to 20 carbon atoms; $R^4$, $R^5$, $R^6$, $R^7$ and $R^8$ are each a hydrocarbon group having 1 to 20 carbon atoms or a hydrogen atom; m is a number satisfying $0 < m \leq 4$; p is an integer of 1 to 1,000, and q is an integer of 2 to 1,000) and then treating the resulting solid product with a mixture of dialkyl ether and titanium tetrachloride.

* * * * *